(12) United States Patent
Zinn et al.

(10) Patent No.: US 8,380,173 B2
(45) Date of Patent: *Feb. 19, 2013

(54) SYSTEM AND METHOD FOR WIRELESS MESSAGING IN A WIRELESS COMMUNICATION SYSTEM

(75) Inventors: Ronald Scotte Zinn, Waterloo (CA); Michael Thomas Hardy, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/270,017

(22) Filed: Oct. 10, 2011

(65) Prior Publication Data

US 2012/0052842 A1  Mar. 1, 2012

Related U.S. Application Data

(63) Continuation of application No. 11/305,315, filed on Dec. 16, 2005, now Pat. No. 8,099,082.

(51) Int. Cl.
*H04L 12/58* (2006.01)
*H04M 1/725* (2006.01)
*H04M 1/663* (2006.01)

(52) U.S. Cl. ............................. 455/412.1; 455/412.2

(58) Field of Classification Search ..... 455/412.1–412.2
See application file for complete search history.

(56) References Cited

U.S. PATENT DOCUMENTS

| | | | |
|---|---|---|---|
| 5,815,665 A | 9/1998 | Teper et al. | |
| 5,963,884 A | 10/1999 | Billington et al. | |
| 5,987,331 A | 11/1999 | Grube et al. | |
| 6,119,167 A * | 9/2000 | Boyle et al. | 709/234 |
| 6,134,432 A | 10/2000 | Holmes et al. | |
| 6,138,146 A | 10/2000 | Moon et al. | |
| 6,195,564 B1 * | 2/2001 | Rydbeck et al. | 455/557 |
| 6,477,150 B1 | 11/2002 | Maggenti et al. | |
| 6,834,182 B2 | 12/2004 | Fu | |
| 6,839,741 B1 | 1/2005 | Tsai | |

(Continued)

FOREIGN PATENT DOCUMENTS

| | | |
|---|---|---|
| EP | 0899918 A2 | 3/1999 |
| EP | 1494429 A2 | 1/2005 |

(Continued)

OTHER PUBLICATIONS

Provisioning Architecture Overview Version Mar. 14, 2001, Wireless Application Protocol WAP-182-ProvArch-20010314-a, Wireless Application Protocol Forum Ltd., Mar. 14, 2001.

(Continued)

*Primary Examiner* — Steven Lim
(74) *Attorney, Agent, or Firm* — John J. Oskorep, Esq.

(57) ABSTRACT

A host service queues data messages received at a message server for delivery to a wireless mobile device. The host service detects a trigger in response to an expiration of a predetermined time interval. In response to detecting the trigger when the data messages are queued, the host service attempts to authenticate a previously-received login credential of the device with respect to a predetermined authentication period. The session is active when the period has not expired, and inactive when the period has expired. When the session is inactive, the host service receives via a wireless network a new login credential from the device, authenticates the new login credential, and activates the session for data message delivery based on the authenticating of the new login credential. When the session is active, the host service causes the data messages to be sent via the wireless network to the device.

20 Claims, 3 Drawing Sheets

U.S. PATENT DOCUMENTS

| | | |
|---|---|---|
| 7,127,236 B2 | 10/2006 | Khan et al. |
| 7,151,932 B2 | 12/2006 | Major |
| 7,424,302 B2 | 9/2008 | Carpenter |
| 2002/0002591 A1 | 1/2002 | Ketola |
| 2003/0204734 A1 | 10/2003 | Wheeler |
| 2003/0233361 A1 | 12/2003 | Cady |
| 2004/0064707 A1 | 4/2004 | McCann et al. |
| 2004/0087300 A1 | 5/2004 | Lewis |
| 2004/0111620 A1 | 6/2004 | Saunders et al. |
| 2004/0242229 A1 | 12/2004 | Okazaki |
| 2004/0268148 A1 | 12/2004 | Karjala et al. |
| 2005/0021667 A1* | 1/2005 | Conway-Jones et al. ..... 709/217 |
| 2005/0038863 A1 | 2/2005 | Onyon et al. |
| 2005/0144485 A1 | 6/2005 | Mousseau |
| 2006/0002556 A1 | 1/2006 | Paul |
| 2006/0052134 A1 | 3/2006 | Sato |
| 2006/0075242 A1 | 4/2006 | Aissi et al. |
| 2006/0224681 A1 | 10/2006 | Wurster |
| 2006/0265340 A1 | 11/2006 | Ziv et al. |
| 2007/0043681 A1 | 2/2007 | Morgan et al. |
| 2007/0050840 A1 | 3/2007 | Grandcolas et al. |
| 2007/0101284 A1* | 5/2007 | Shaw et al. ................... 715/772 |
| 2007/0150723 A1 | 6/2007 | Estable et al. |
| 2008/0009345 A1 | 1/2008 | Bailey et al. |
| 2008/0162499 A1 | 7/2008 | Connor et al. |
| 2008/0178273 A1 | 7/2008 | Weber |

FOREIGN PATENT DOCUMENTS

| | | |
|---|---|---|
| EP | 1933252 A1 | 6/2008 |
| WO | 9409599 A1 | 4/1994 |
| WO | 0196726 A2 | 5/2001 |
| WO | 03107710 A1 | 12/2003 |
| WO | 2004086784 A1 | 10/2004 |

OTHER PUBLICATIONS

Provisioning Bootstrap Version 14-Mar.-2001, Wireless Application Protocol WAP-182-ProvArch-20010314-a, Wireless Application Protocol Forum Ltd., Mar. 14, 2001.

Push-to-talk over Cellular (PoC); Architecture; PoC Release 2.0; Technical Specification, Architecture V2.0.8 (Jun. 2004).

S/MIME Support Package, Release 4.0, White Paper, 2005, Research in Motion Limited.

BlackBerry Security, White Paper, Release 4.0, 2005, Research in Motion Limited.

Wireless LAN (WLAN) End to End Guidelines for Enterprises and Public Hotspot Service Providers, Intel Communications, Release 1.1 Nov. 2003.

Certificate Authority Proxy Function, Cisco IP Phone Authentication and Encryption for Cisco Call Manager, 4.0(1).

Step-By-Step Guide to Deploying Microsoft Exchange Server 2003 SP2 Mobile Messaging With Windows Mobile 5.0-Based Devices, Windows Mobile, Mar. 2006.

Blackberry Enterprise Server Version 3.6 for Microsoft Exchange, 2003, Research in Motion Limited.

* cited by examiner

SYSTEM AND METHOD FOR WIRELESS MESSAGING IN A WIRELESS COMMUNICATION SYSTEM

CROSS-REFERENCE TO RELATED APPLICATION

The present application is a continuation of and claims priority to U.S. non-provisional patent application having application Ser. No. 11/305,315 and filing date of 16 Dec. 2005, now U.S. Pat. No. 8,099,082, which is hereby incorporated by reference herein.

FIELD OF THE INVENTION

The present invention generally relates to a wireless communication system, and more specifically to a system and a method for wireless messaging.

BACKGROUND OF THE INVENTION

In a conventional wireless communication system designed to deliver data to a wireless mobile communication device ("mobile device") such as a cellular telephone, a two-way pager, a wireless communication capable personal digital assistant ("PDA"), and other similar device, there are several main components. A host service, which provides services such as e-mail, calendar, and Internet web browsing, holds the data to be delivered to the mobile device. Typically, the host service is coupled to a router, which couples the host service and a wireless network that is designed to communicate with the mobile device. To make a timely delivery of the data, the host service forwards the data for the mobile device to the router when the data becomes available. The router then forwards the data to the wireless network, which transmits the data to the mobile device. If the mobile device fails to receive the data, the router queues the data and re-forwards the data to the wireless network, which re-transmits the data to the mobile device. This process continues until the mobile device receives the data and acknowledges the reception or the process times out after a predetermined time period.

In typical wireless communication systems, a mobile device requires a service session to be established to be able to communicate wirelessly with a host service. As is known, a service session (or session) is typically initiated by the mobile device and can be terminated for a variety of reasons. For example, if during an active session a mobile device roams out of wireless coverage, the session will be effectively terminated. Once out of coverage, no wireless activity such as sending or receiving e-mail messages, browsing web sites or sending/receiving instant messages can be conducted.

In some cases, it may be desirable to control service sessions on demand, or in other words, to match the transmission needs of both the mobile device and host services. For the same reasons, it may be desirable to have the ability to initiate a session from a variety of events occurring at both the device or host service.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which.

DETAILED DESCRIPTION OF THE PREFERRED EMBODIMENTS

Figure 1:
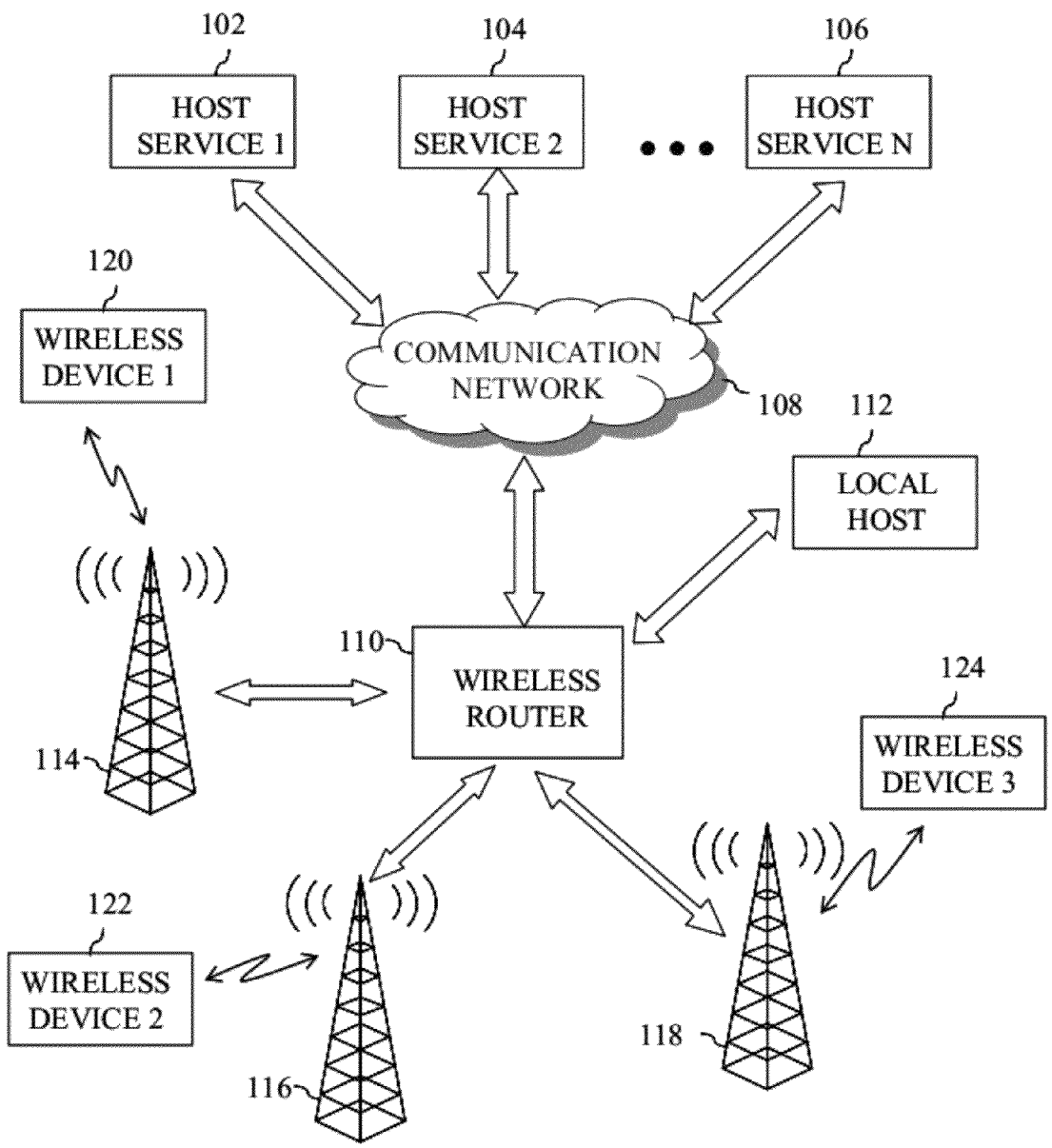
FIG. 1 is an exemplary environment in which a wireless communication system in accordance with at least one of the preferred embodiments may be practiced.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

Examples of applicable communication devices include pagers, cellular phones, cellular smart-phones, wireless organizers, personal digital assistants, computers, laptops, handheld wireless communication devices, wirelessly enabled notebook computers and the like, each of which is capable of sending messages to one or more recipients.

A wireless communication system, comprising a host service, a wireless router system coupled to the host service, a wireless network coupling the wireless router system and a wireless mobile communication device ("mobile device"), adaptively delivers data to the mobile device in the wireless communication system.

According to an preferred embodiment, a state independent session initiated by either a host service or a mobile device using login credentials is provided. In this embodiment, an activity trigger is used to initiate a session from the mobile device. Login credentials are sent from the device to the host for authentication and a service session is enabled upon successful authentication. Login credentials are aged and are reset if timed out, whereupon the mobile device would need to resend the login credentials for the next session.

In another embodiment, a receive or host trigger is used by the host to initiate a service session where messages are delivered to the mobile device. The host trigger consists of the receipt of a message from a host. Upon detection of a service session, messages are sent to the device. If a session is inactive, the host operates to request login credentials from the mobile device. Detection of a logoff trigger from the mobile device will terminate an existing session and current login credentials will also expire.

FIG. 1 is an exemplary wireless communication system 100 in which a wireless communication system in accordance with at least one of the preferred embodiments may be practiced. The exemplary wireless communication system 100 includes a plurality of host services (three shown, 102, 104, and 106), each of which may have a plurality of services such as, but not limited to, e-mail, calendar, Internet web browser, and other applications, available to their subscribers. The host services 102, 104, and 106 are connected to a communication network 108 such as Internet, which connects to a wireless router system 110 allowing communication between the host services 102, 104, and 106 and the wireless router 110. The wireless router system 110 may also be connected to a host service, such as a local service 112, without the communication network 108. The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, a two-way paging network, a short range wireless network such as Bluetooth™ and IEEE 802.11 compliant network, and others alike, and the mobile devices 120, 122, and 124 are device compatible with the corresponding wireless network.

Mobile devices 120, 122 and 124 are two-way communication devices with advanced data communication capabilities having the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 2:
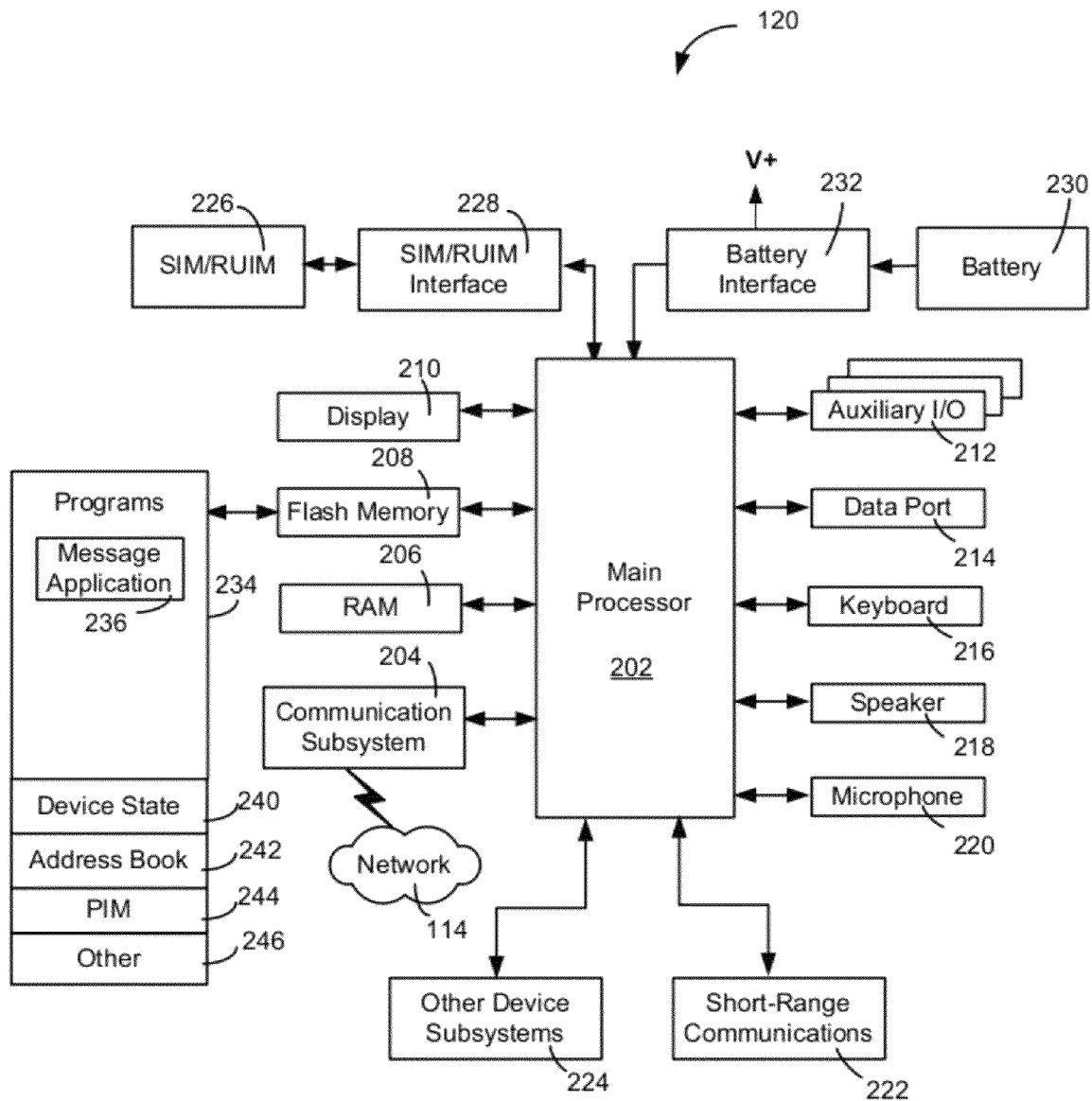
FIG. 2 is an exemplary block diagram of a preferred embodiment of a mobile communication device.

Referring to FIG. 2, shown therein is a block diagram of a mobile device 120 in one exemplary implementation. The mobile device 120 comprises a number of components, the controlling component being a main processor 202 which controls the overall operation of mobile device 120. Communication functions, including data and voice communications, are performed through a communication subsystem 204. The communication subsystem 204 receives messages from and sends messages to a wireless network 114. In this exemplary implementation of the mobile device 120, the communication subsystem 204 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 204 with the wireless network 114 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 114 associated with mobile device 120 is a GSM/GPRS wireless network in one exemplary implementation, other wireless networks may also be associated with the mobile device 120 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 202 also interacts with additional subsystems such as a Random Access Memory (RAM) 206, a flash memory 208, a display 210, an auxiliary input/output (I/O) subsystem 212, a data port 214, a keyboard 216, a speaker 218, a microphone 220, short-range communications 222 and other device subsystems 224.

Some of the subsystems of the mobile device 120 perform communication-related functions, whereas other subsystems may provide "resident" or on-device functions. By way of example, the display 210 and the keyboard 216 may be used for both communication-related functions, such as entering a text message for transmission over the network 114, and device-resident functions such as a calculator or task list. Operating system software used by the main processor 202 is typically stored in a persistent store such as the flash memory 208, which may alternatively be a read-only memory (ROM) or similar storage element (not shown). Those skilled in the art will appreciate that the operating system, specific device applications, or parts thereof, may be temporarily loaded into a volatile store such as the RAM 206.

The mobile device 120 may send and receive communication signals over the wireless network 114 after required network registration or activation procedures have been completed. Network access is associated with a subscriber or user of the mobile device 120. To identify a subscriber, the mobile device 120 requires a SIM/RUIM card 226 (i.e. Subscriber Identity Module or a Removable User Identity Module) to be inserted into a SIM/RUIM interface 228 in order to communicate with a network. The SIM card or RUIM 226 is one type of a conventional "smart card" that can be used to identify a subscriber of the mobile device 120 and to personalize the mobile device 120, among other things. Without the SIM card 226, the mobile device 120 is not fully operational for communication with the wireless network 114. By inserting the SIM card/RUIM 226 into the SIM/RUIM interface 228, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 226 includes a processor and memory for storing information. Once the SIM card/RUIM 226 is inserted into the SIM/RUIM interface 228, it is coupled to the main processor 202. In order to identify the subscriber, the SIM card/RUIM 226 contains some user parameters such as an International Mobile Subscriber Identity (IMSI). An advantage of using the SIM card/RUIM 226 is that a subscriber is not necessarily bound by any single physical mobile device. The SIM card/RUIM 226 may store additional subscriber information for a mobile device as well, including date book (or calendar) information and recent call information. Alternatively, user identification information can also be programmed into the flash memory 208.

The mobile device 120 is a battery-powered device and includes a battery interface 232 for receiving one or more rechargeable batteries 130. In some embodiments, the battery 230 may be a smart battery with an embedded microprocessor. The battery interface 232 is coupled to a regulator (not shown), which assists the battery 230 in providing power V+ to the mobile device 120.

The main processor 202, in addition to its operating system functions, enables execution of software applications 234 on the mobile device 120. The subset of software applications 234 that control basic device operations, including data and voice communication applications, will normally be installed on the mobile device 120 during its manufacture.

The software applications 234 include a message application 236. The message application 236 can be any suitable software program that allows a user of the mobile device 120 to send and receive electronic messages. Various alternatives exist for the message application 236 as is well known to those skilled in the art. Messages that have been sent or received by the user are typically stored in the flash memory 208 of the mobile device 120 or some other suitable storage element in the mobile device 120. In an alternative embodiment, some of the sent and received messages may be stored remotely from the device 120 such as in a data store of an associated host system that the mobile device 120 communicates with.

Mobile device 120 further includes a device state module 240, an address book 242, a Personal Information Manager (PIM) 244, and other modules 246. The device state module 240 provides persistence, i.e. the device state module 240 ensures that important device data is stored in persistent memory, such as the flash memory 208, so that the data is not lost when the mobile device 120 is turned off or loses power. The address book 242 provides information for a list of contacts for the user. For a given contact in the address book, the information can include the name, phone number, work address and email address of the contact, among other information. The other modules 246 may include a configuration module (not shown) as well as other modules that can be used in conjunction with the SIM/RUIM interface 228.

The PIM 244 has functionality for organizing and managing data items of interest to a subscriber, such as, but not limited to, e-mail, calendar events, voice mails, appointments, and task items. A PIM application has the ability to send and receive data items via the wireless network 114. PIM data items may be seamlessly integrated, synchronized, and updated via the wireless network 114 with the mobile device subscriber's corresponding data items stored and/or associated with a host computer system. This functionality creates a mirrored host computer on the mobile device 120 with respect to such items. This can be particularly advantageous when the host computer system is the mobile device subscriber's office computer system.

Additional applications may also be loaded onto the mobile device 120 through at least one of the wireless network 114, the auxiliary I/O subsystem 212, the data port 214, the short-range communications subsystem 222, or any other suitable device subsystem 224. This flexibility in application installation increases the functionality of the mobile device 120 and may provide enhanced on-device functions, communication-related functions, or both. For example, secure communication applications may enable electronic commerce functions and other such financial transactions to be performed using the mobile device 120.

The data port 214 enables a subscriber to set preferences through an external device or software application and extends the capabilities of the mobile device 120 by providing for information or software downloads to the mobile device 120 other than through a wireless communication network. The alternate download path may, for example, be used to load an encryption key onto the mobile device 120 through a direct and thus reliable and trusted connection to provide secure device communication.

The data port 214 can be any suitable port that enables data communication between the mobile device 120 and another computing device. The data port can be a serial or a parallel port. In some instances, the data port 214 can be a USB port that includes data lines for data transfer and a supply line that can provide a charging current to charge the battery 230 of the mobile device 120.

The short-range communications subsystem 222 provides for communication between the mobile device 120 and different systems or devices, without the use of the wireless network 114. For example, the subsystem 222 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 204 and input to the main processor 202. The main processor 202 will then process the received signal for output to the display 210 or alternatively to the auxiliary I/O subsystem 212. A subscriber may also compose data items, such as e-mail messages, for example, using the keyboard 216 in conjunction with the display 210 and possibly the auxiliary I/O subsystem 212. The auxiliary subsystem 212 may include devices such as: a touch screen, mouse, track ball, infrared fingerprint detector, or a roller wheel with dynamic button pressing capability. The keyboard 216 is preferably an alphanumeric keyboard and/or telephone-type keypad. However, other types of keyboards may also be used. A composed item may be transmitted over the wireless network 114 through the communication subsystem 204.

For voice communications, the overall operation of the mobile device 120 is substantially similar, except that the received signals are output to the speaker 218, and signals for transmission are generated by the microphone 220. Alternative voice or audio I/O subsystems, such as a voice message recording subsystem, can also be implemented on the mobile device 120. Although voice or audio signal output is accomplished primarily through the speaker 218, the display 210 can also be used to provide additional information such as the identity of a calling party, duration of a voice call, or other voice call related information.

Figure 3:
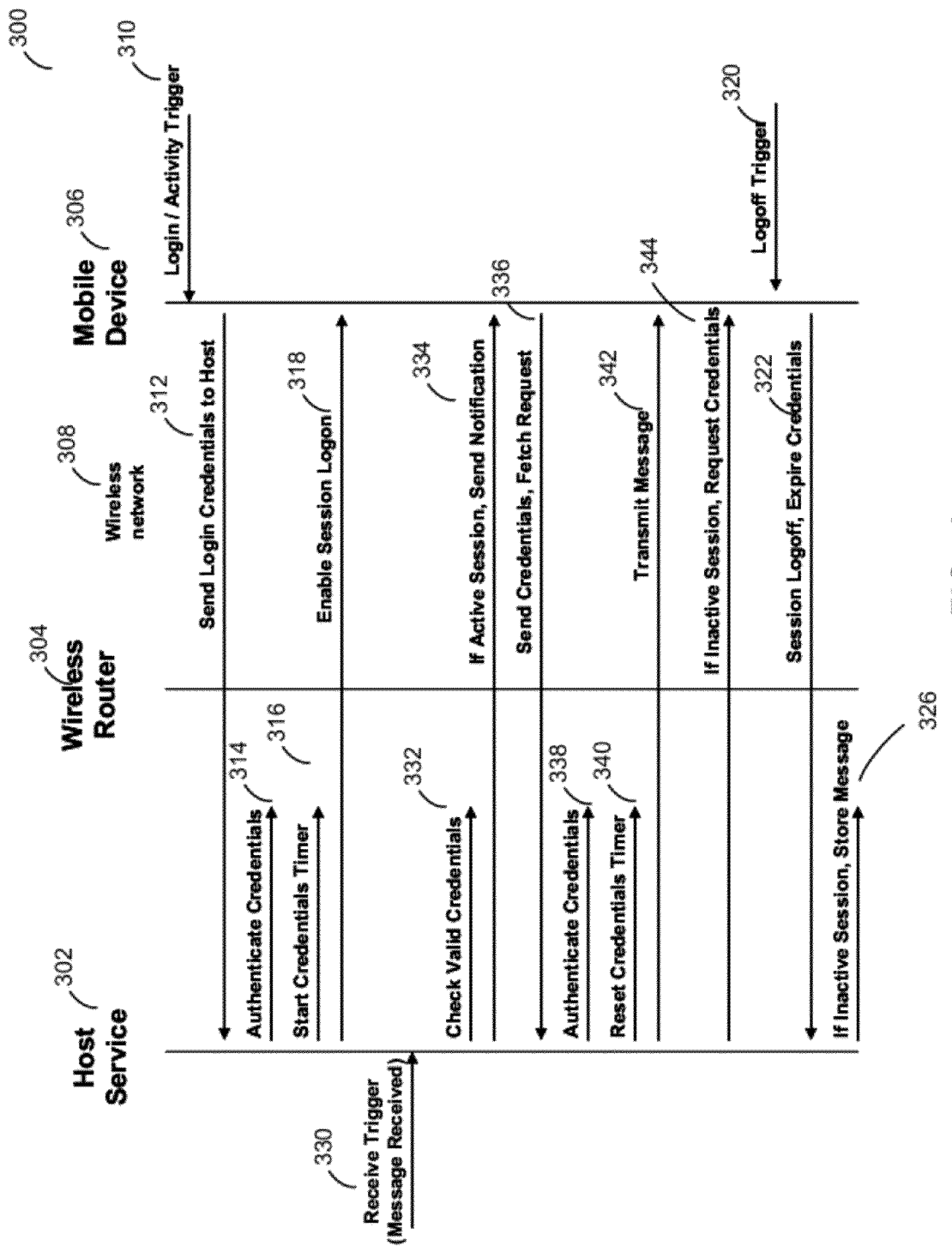
FIG. 3 is an exemplary sequence diagram illustrating communication between different components of a wireless communication system.

FIG. 3 is an exemplary sequence diagram illustrating communication between different components of communication system 300. Communication system 300 comprises of a host service 302, wireless router 304, and a mobile device 306 operating on wireless network 308. Host service 302 is synonymous with host service 102, 104 and 106 of FIG. 1, and is responsible for handling message delivery to and from mobile device 306. Host service 302 receives e-mail messages from its designated corporate email server, such as Microsoft Exchange™, Lotus Notes™, and/or Novell Groupwise™, and temporarily stores the content on a host service server (not shown). In addition to supporting corporate mail servers, host service 302 may handle public mail services such as Yahoo Mail™, Microsoft Hotmail™, Google GMail™, and the like. Host service 302 may also handle other types of data services and messaging types such as instant messages, web browsing, SMS, MMS and/or voice messages.

When a wireless service session is active between the mobile device 306 and host service 302 (i.e., the user is logged onto a session), the user is able to send messages to the host service 302 and receive all incoming messages from host service 302. For example, a message that arrives at host service 302 during an active session will be redirected to wireless router 304, and then wirelessly routed across wireless network 308, to mobile device 306. One of a plurality of resident programs 234, for example message application 236, then receives the incoming message and possibly displays it for the user to view on mobile device 306.

The creation of a communication session may be initiated at the host service 302 or at the mobile device 306. For example, a device-initiated session may be triggered by an activity trigger 310. An activity trigger 310 is any event (user or device generated) that indicates to mobile device 306 and host service 302 that a user at mobile device 306 would like to initiate a service session. Activity trigger 310 captures any perceived user or device-initiated activity. Activity trigger 310 also includes any user-initiated or device-initiated session login (i.e., active session activation) and may be synonymously known as a login trigger. Activity trigger 310 may be one or a combination of many events, including a manual or automatic login to a session, powering on the device, turning on the radio, a keypress on keyboard 216, scrolling activity on a thumbwheel, touch-screen input on a touch-screen display, or releasing the device from a holster or case.

A further example of an activity trigger that is either user or device-generated is a predefined Auto On event where the device is programmed to systematically turn on and initiate a session at a pre-defined time or day. For example, an Auto On event may be to turn mobile device 306 on at 8:00 am on weekdays. Yet a further example of an activity trigger is radio activity by mobile device 306. Radio activity includes sending regular "ping" updates to host service 302 to check for any incoming messages, and/or "out of coverage" and "back in coverage" notifications. For example, when mobile device 306 is out of coverage, it may wish to inform host service 302 that it is back in coverage and can continue its session.

Upon detection of activity trigger 310 may be either user or device-initiated, mobile device 306 sends login credentials entered by the user to host service 302, at step 312. Login credentials include authentication information that enables the user to log onto a wireless session. These credentials may consists of a login name and password, a shared public or private key, a secret token and/or a VPN token. Login credentials may be manually entered by the user or automatically stored in cache memory or permanent memory on mobile device 306. In certain embodiments, login credentials may undergo a redundancy check to ensure that the credentials are correct. Incorrect values are dropped until correct values are entered. Further embodiments of this invention may not allow the process to proceed until correct credentials are entered.

Once the login credentials are received at host service 302, the credentials are then authenticated, at step 314 by the host service 302 for a predetermined authentication period. Authentication ensures that the login credentials are valid and that host service 302 can enable an active session. To keep track of the authentication period, a credentials timer is started, at step 316 and thereafter a session is enabled, at step 318. In certain embodiments, if a session is active and the credentials timer is running (i.e., the credentials are still authenticated and valid), the mobile device 306 does not send further login credentials to the host, at step 312 when further activity triggers are detected, at step 310. Mobile device 306 may optionally send notification of a further activity trigger to the host service 302 with login credentials to reset the credentials timer and keep the service session active. However, typically, once a session has been activated, further login credentials authentications are required only if the session is terminated or the credentials timer has expired.

A second example of a device-initiated session trigger is a logoff trigger 320. In this example, logoff trigger 320 occurs when mobile device 306 receives a session termination event (i.e., a log off event). Logoff trigger 320 may include such events as powering down the device, turning off the device's radio 204, mobile device 306 going out of coverage, or the user manually requesting a log off event. Logoff trigger 312 might also include an inactivity timeout where based on a predefined period of inactivity, the device logs off the session with the host service 302. Logoff trigger 312 may also be an automatic Auto Off event where the device shuts down based on a programmed Auto Off date and/or time. For example, mobile device 306 may be set to power down and log off a session at 11 pm each night when the user retires to bed.

Upon detecting a logoff trigger 320, mobile device 306 sends a notification to host service 302 to log off its current session, at step 322. This notification message also informs host service 302 to expire or invalidate the existing login credentials. As a result, a new set of credentials would be required for a subsequent session. If any incoming messages arrives at the host service 302 during an inactive session, the message is stored in memory, at step 326, until the next active session where these queued messages can be sent down to the mobile device 306.

In addition to a device-initiated session, there may also exist host-initiated session. In certain embodiments, host-initiated sessions can be initiated when a message receive trigger 330 is detected at the host service 302. Message receive trigger 330 may be one or a combination of many events including receiving an e-mail message, an instant message, a voicemail message, a SMS message or other forms of data messages where the intended recipient is the mobile device 306.

In this exemplary embodiment in FIG. 3, the message receive trigger 330 is the receipt of an e-mail message. Upon receipt, host service 302 checks to see that the login credentials previously received from the mobile device 306 are valid or authenticated, at step 332. If the credentials are deemed to be valid and mobile device 306 is currently in a session, a notification message is sent to the device 306, at step 334. The notification message only serves to inform mobile device 306 of incoming mail and does not contain any payload information related to the incoming e-mail message.

Once mobile device 306 receives the notification message at step 334, it then responds with a fetch request to fetch the message, at step 336. The request message also includes the device login credentials. Upon receiving the fetch request, host service 302 authenticates the attached credentials, at step 338, and resets the credentials timer, at step 340. If the authentication is successful, host service 302 sends it to mobile device 306, at step 342.

However, if host service 302 deems that mobile device 306 is not in an active session (e.g. logged off), it sends a request for login credentials, at step 344 and subsequently, host service 302 and mobile device 306 perform steps 310 to 318 again to enter into an active service session.

Specifically, mobile device 306 responds to this credentials request either by the detection of a user-initiated activity trigger or by a device-initiated activity trigger, at step 310. An example of a device-initiated activity trigger is a regular "ping" update sent from mobile device 306 to host service 302 reporting to host service 302 the status of the device 306. This "ping" update activity trigger also includes login credentials (step 312). Upon successful authentication (step 314), mobile device 306 logs onto host service 302 with an active session (step 318). Once a message arrives (step 330) at the host service 302, a quick check is done to ensure valid credentials (step 332). A notification is sent to the mobile device 306 informing the device 306 of the new message (step 334), whereupon the device 306 responds with a fetch request, including a set of credentials (step 336). The credentials are then authenticated (step 338) and the credentials timer is reset (340) to keep the authentication valid for another authentication period. Thereafter, the message is sent from the host service 302 to the device (step 342).

The aforementioned embodiment in FIG. 3 highlights an example where for every single message received at host service 302, a separate notification message is sent to mobile device, at step 334. Further a separate fetch request with credentials is sent back to the host service, at step 336. And finally, each message is separately sent to the device 306, at step 336. However, it is understood that further embodiments may exist where notifications, fetch requests and/or messages are batched together and sent in one larger batch message. Sending notifications, fetch requests and messages in batch mode (i.e., send one larger messages for many smaller separate messages) advantageously reduces network latency since less data is sent across the network 308.

Further batch messages may occur at timed intervals. For example, host service 302 may queue messages received in 10 minute intervals (or any other prescribed intervals). In this example, every 10 minutes, host service 302 would send a batch notification advising mobile device 306 of all new messages that have arrived within a 10 minute timeframe. The mobile device 306 may respond with a batch fetch request, upon receipt of which the host service 302 would send all the messages it has received within the interval to the mobile device 302 in one batch message.

Once credentials are authenticated, at step 314, the credentials are only valid for a certain period of time which is defined by the predetermined authentication period mentioned above. This authentication period (which can be any predetermined value) is accounted for by setting the credentials timer to this value and decrementing it or setting the timer to zero and incrementing it until it reaches the authentication period value. Once the credentials timer has expired (i.e. reached zero or the authentication period value), at step 316, mobile device 306 can no longer maintain a session active unless a new trigger is detected at either the host or at the device and new credentials are authenticated. Note that login credential authentication at steps 314 and 338 are compared with a set of valid credentials stored at host service 302.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a host service for use in communicating data messages between the host service and a wireless mobile device configured to operate in a wireless network, the method comprising:
   queuing one or more data messages received at a message server for delivery to the wireless mobile device;
   detecting a trigger in response to an expiration of a predetermined time interval;
   in response to the detecting of the trigger when the one or more data messages are queued: attempting to authenticate, at the host service, a saved login credential of the wireless mobile device with respect to a predetermined authentication period, the saved login credential being previously received and saved at the host service from a previous login of the wireless mobile device at the host service for activating a service session for data message delivery, the service session being active when the predetermined authentication period has not expired and being inactive when the predetermined authentication period has expired;
   when the service session is inactive:
      receiving, via the wireless network, a new login credential from the wireless mobile device;
      saving the new login credential;
      authenticating, at the host service, the new login credential;
      activating the service session for data message delivery based on the authenticating of the new login credential; and
   when the service session is active: causing the one or more data messages to be sent, from the host service via the wireless network, to the wireless mobile device.

2. The method of claim 1, wherein the one or more data messages comprise one or more electronic mail (e-mail) messages.

3. The method of claim 1 wherein the one or more data messages are received in a personal information manager (PIM) application of the wireless mobile device.

4. The method of claim 1, wherein when the service session is active, the one or more data messages are sent in a batch mode, via the wireless network, from the host service to the wireless mobile device.

5. The method of claim 1 further comprising:
   requesting, via the wireless network, the new login credential of the wireless mobile device.

6. The method of claim 1 wherein the saved login credential includes at least one of a login, password, a shared public, a private key, a secret token or a virtual private network (VPN) token.

7. The method of claim 1 further comprising:
   in response to the detecting of the trigger when the one or more data messages are queued:
      producing, at the host service, a batch notification message which is indicative of the receipt of the one or more data messages; and
      sending, via the wireless network, a batch notification message to the wireless mobile device.

8. The method of claim 7 further comprising:
   receiving, via the wireless network, a new login credential from the wireless mobile device in response to the batch notification message.

9. The method of claim 7, wherein payload information of the one or more data messages is absent from the batch notification message.

10. The method of claim 7, wherein the batch notification message comprises a SMS message.

11. A host service configured to communicate data messages to a wireless mobile device operating in a wireless network, the host service being further configured to queue one or more data messages received at a message server for delivery to the wireless mobile device; in response to detection of a trigger from an expiration of a predetermined time interval when the one or more data messages are queued: attempt to authenticate, at the host service, a saved login credential of the wireless mobile device with respect to a predetermined authentication period, the saved login credential being previously received and saved at the host service from a previous login of the wireless mobile device at the host service for activating a service session for data message delivery, the service session being active when the predetermined authentication period has not expired and being inactive when the predetermined authentication period has expired; when the service session is inactive: receive, via the wireless network, a new login credential from the wireless mobile device;

saving the new login credential; authenticate, at the host service, the new login credential; activate the service session for data message delivery based on the authenticating of the new login credential; and when the service session is active: cause the one or more data messages to be sent, from the host service via the wireless network, to the wireless mobile device.

12. The host service of claim 11, wherein the one or more data messages comprise one or more electronic mail (e-mail) messages.

13. The host service of claim 11, wherein the one or more data messages are received in a personal information manager (PIM) application of the wireless mobile device.

14. The host service of claim 11, wherein when the service session is active, the one or more data messages are sent in a batch mode, via the wireless network, from the host service to the wireless mobile device.

15. The host service of claim 11, which is further configured to request, via the wireless network, the new login credential of the wireless mobile device.

16. The host service of claim 11, wherein the saved login credential includes at least one of a login, password, a shared public, a private key, a secret token or a virtual private network (VPN) token.

17. The host service of claim 11, which is further configured to, in response to the detecting of the trigger when the one or more data messages are queued, produce, at the host service, a batch notification message which is indicative of the receipt of the one or more data messages; and send, via the wireless network, a batch notification message to the wireless mobile device.

18. The host service of claim 17, which is further configured to receive, via the wireless network, a new login credential from the wireless mobile device in response to the batch notification message.

19. The host service of claim 17, wherein payload information of the one or more data messages is absent from the batch notification message.

20. The host service of claim 17, wherein the batch notification message comprises a SMS message.

* * * * *